Feb. 17, 1959   R. W. WILSON   2,873,843
MAGNETIC CONVEYOR

Filed Oct. 2, 1957   3 Sheets-Sheet 1

Inventor
Rufus W. Wilson,

By Karl W. Flocks
Attorney

Inventor
Rufus W. Wilson,
By Karl W. Flocks
Attorney

Feb. 17, 1959  R. W. WILSON  2,873,843
MAGNETIC CONVEYOR
Filed Oct. 2, 1957  3 Sheets-Sheet 3

Inventor
Rufus W. Wilson,
By Karl W. Flocks
Attorney

United States Patent Office 2,873,843
Patented Feb. 17, 1959

2,873,843

MAGNETIC CONVEYOR

Rufus W. Wilson, Huntingdon, Pa., assignor to Wald Industries, Inc., Huntingdon, Pa., a corporation of Pennsylvania Application October 2, 1957, Serial No. 687,678

14 Claims. (Cl. 198—41)

This invention relates to conveyors and more particularly to a magnetic conveyor for moving ferromagnetic objects.

In various industrial processes it is frequently desirable to convey a ferromagnetic object for a predetermined distance in a fixed position relative to the conveyor and then to release the object so that it is free to move off of the conveyor at the discharge point. For example, in the painting or coating of metal automobile license plates, the license plates are carried by a conveyor past the coating or painting apparatus and it is important that the license plates be held in a predetermined fixed position on the conveyor and be securely held against shifting movement on the conveyor during the coating process. However, it is also necessary that the plates be free to easily move off of the conveyor when they reach the end of the conveyor path.

Conveyors have been developed in the past in which ferromagnetic objects are subjected to a magnetic force which holds them in a predetermined orientation with respect to the conveyor while the objects are passing through a particular zone. In one type of conveyor which has been developed, the conveyor passes over a stationary magnetic field located in the predetermined zone, the stationary magnetic field exerting a downward magnetic pull on the ferromagnetic objects carried by the conveyor to prevent shifting movement of the objects on the conveyor as the objects pass through the zone where the stationary magnetic field is located. The use of a stationary magnetic field cooperating with a moving conveyor as just described often results in excessive wear on the moving conveyor due to the fact that the stationary magnetic field in acting upon the ferromagnetic objects draws the conveyor down into wearing contact with the stationary magnetic field structure, causing excessive wear on the conveyor.

It has also been proposed to utilize two separate conveyor members including an outer material carrying conveyor of non-magnetic material and an inner magnetic conveyor, with the paths of movement of the two conveyors being offset adjacent the discharge end of the conveyor system in such manner that the magnetic attraction of the inner conveyor on the articles carried by the outer conveyor diminishes to permit release of the articles at the discharge point.

None of the magnetic conveyors of the prior art of which I am aware includes a combined outer or material-carrying conveyor and an inner magnetic conveyor which are so related to each other that the magnetic conveyor is in direct engagement with the ferromagnetic objects being conveyed while the objects are passing through a predetermined zone, with the magnetic conveyor moving out of magnetic relation to the objects at the end of the zone and permitting the outer material-carrying conveyor to carry the objects to the discharge point. Furthermore, none of the combined outer material-carrying and inner magnetic conveyors of which I am aware provide a direct mechanical interlocking of the magnets of the magnetic conveyor with openings in the material-carrying conveyor to provide a direct driving connection between the two conveyors.

Accordingly, it is an object of this invention to provide an improved magnetic conveyor which directly engages the ferromagnetic objects for a predetermined period without an intervening air gap and releases its magnetic attraction at the end of the predetermined period to permit a second or material-carrying conveyor to deliver the objects to a discharge point.

It is another object of this invention to provide a combined material-carrying conveyor and magnetic conveyor in which the two conveyors are mechanically interconnected in such manner that only one of the conveyors need be positively driven.

It is still another object of this invention to provide a magnetic conveyor in which the full strength of the magnetic field is utilized to hold the ferromagnetic objects in a fixed position while they pass through a predetermined zone and in which a sharp reduction in the magnetic attraction is obtained at the end of the predetermined zone.

It is still a further object of the invention to provide a magnetic conveyor of relatively uncomplicated and inexpensive construction which utilizes permanent magnets as its source of magnetic force.

In achievement of these objectives, there is provided in accordance with an embodiment of this invention a magnetic conveyor including an outer material-carrying conveyor of non-magnetic material having a plurality of apertures through the surface thereof, and an inner conveyor mounted for movement adjacent the inner surface of the outer conveyor and having positioned thereon a plurality of permanent magnets which pass through the apertures of the outer conveyor into direct magnetic contact with ferromagnetic objects carried by the outer conveyor. An important advantage of the conveyor construction is that the engagement of the magnets of one conveyor with the apertures of the other conveyor provides a direct mechanical driving relation between the inner and outer conveyors.

Further objects and advantages of the invention will be apparent from the following description taken in conjunction with the accompanying drawings, wherein.

Figure 1:
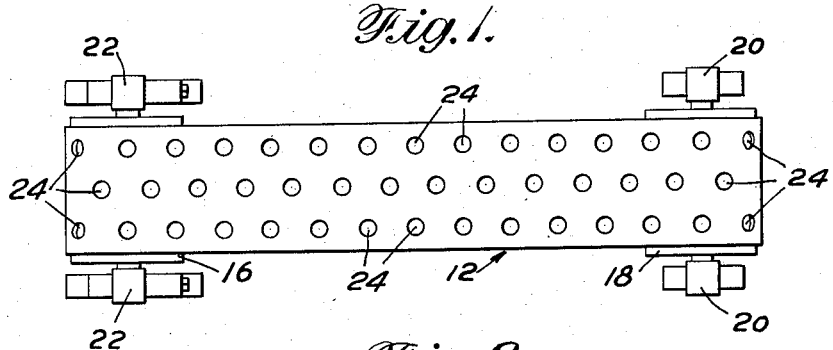
Fig. 1 is a top plan view of the outer or material-carrying conveyor.
Figure 2:
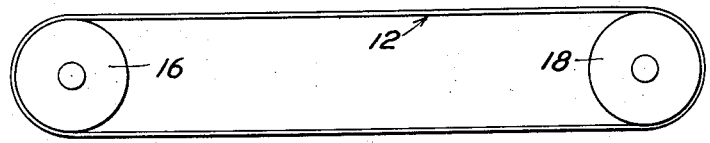
Fig. 2 is a side elevation view of the outer conveyor.
Figure 3:
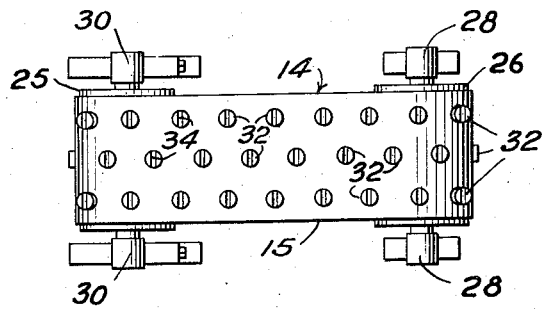
Fig. 3 is a top plan view of the inner or magnetic conveyor.
Figure 4:
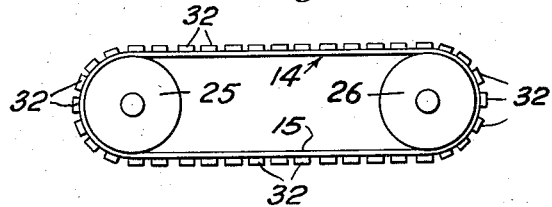
Fig. 4 is a side elevation view of the inner conveyor.

Referring now to the drawings, the conveyor assembly is generally indicated at 10 and includes an outer or material-carrying conveyor generally indicated at 12 and an inner or magnetic conveyor generally indicated at 14.

Outer conveyor 12 is an endless belt formed of non-magnetic material and trained around a pair of oppositely disposed pulleys 16 and 18, respectively. Pulley 18 is supported for rotation by oppositely disposed fixed bearings 20 while pulley 16 is supported for rotation by longitudinally adjustable bearings 22 which permit adjustment of the tension on conveyor 12. Outer conveyor 12 is provided with a plurality of circular apertures 24 throughout its entire length, apertures 24 being arranged in a plurality of rows extending longitudinally in the direction of movement of the conveyor, three such rows being shown in the drawings, including two outer rows and an intermediate or middle row. In the illustrated embodiment, the apertures of the two outer rows are in alignment with each other in a direction transverse of the length of the conveyor while the apertures of the middle row are offset a short distance longitudinally of the apertures of the outer rows.

The magnetic conveyor generally indicated at 14 includes an endless belt 15 of non-magnetic material which is trained around a pair of spaced pulley members 25 and 26. The diameters of pulleys 25 and 26 of inner conveyor 14 are equal to each other but are of slightly smaller diameter than pulleys 16 and 18 of outer conveyor 12. The smaller diameter of pulleys 25 and 26 permits belt 15 of conveyor 14 to lie within the outer endless conveyor 12. It will be noted that the respective upper and lower runs of the two conveyors extend parallel to each other from the point of tangency at pulley 25 to the point of tangency at pulley 26.

Pulley 26 is supported by a pair of laterally spaced fixed bearing members 28 while pulley 25 is supported by a pair of oppositely disposed laterally spaced longitudinally adjustable bearings 30 which may be adjusted to regulate the tension on inner conveyor 14. Pulleys 16 and 18 of outer conveyor 12 and pulleys 25 and 26 of inner conveyor 14 all have their axes lying in a common horizontal plane. The distance between pulleys 25 and 26 of inner conveyor 14 is less than the distance between pulleys 16 and 18 of outer conveyor 12. Inner conveyor 14 is therefore of shorter length than outer conveyor 12. In the illustrated embodiment, pulleys 25 and 26 of the inner conveyor are spaced substantially equal distances from the respective pulleys 16 and 18 of outer conveyor 12.

A plurality of permanent magnets 32 are secured in position on the outer surface of belt 15 of inner conveyor 14 in such manner as to project outwardly from the outer surface of conveyor 14. In the embodiment of Figs. 3–7, magnets 32 are of generally cylindrical shape and are each provided at their outer ends with a transverse slot 34 which defines a pair of oppositely disposed poles 36 and 38 extending from the outer face of magnets 32. Magnets 32 may be attached in any suitable manner to the upper or outer surface of belt 15 of conveyor 14 and in the arrangement illustrated in Fig. 7, belt 15 is provided with a countersunk passage for receiving the fastening means of each magnet. A countersunk head screw 37 passes through the countersunk passage in belt 15 to engage a threaded hole in the respective magnets 32 adjacent the countersunk passage of belt 15. Magnets 32 are arranged in rows on belt 15 in the same manner as apertures 24 of outer conveyor 12, the spacing between the rows of magnets and between the magnets of each row corresponding to the spacing of apertures 24 of outer conveyor 12. Magnets 32 are preferably permanent magnets of the type made of an alloy of iron, aluminum, nickel and cobalt and sold by the General Electric Company under the trade name "Alnico."

Figure 5:
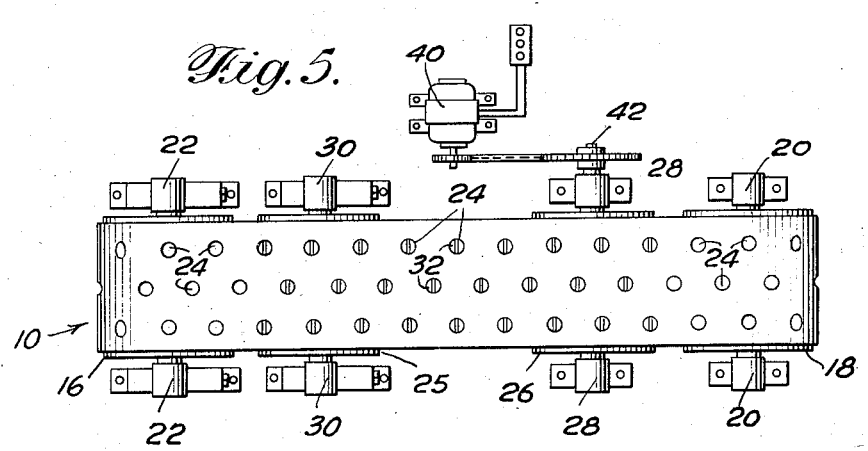
Fig. 5 is a top plan view of the entire conveyor assembly including the inner and outer conveyors.

Either outer conveyor 12 or inner conveyor 14 may serve as the driving conveyor. In the illustrated embodiment, as shown in Fig. 5, a drive motor generally indicated at 40 is connected through any suitable transmission such as a roller chain or V-belt to drive shaft 42 of pulley 26 of inner conveyor 14. Rotation of shaft 42 by motor 40 causes pulley 26 to rotate, thereby rotating inner conveyor 14. The magnets 32 of inner conveyor 14 extend through apertures 24 of outer conveyor 12 and thereby engages outer conveyor 12 in driving relation. It will be assumed for purposes of description that the conveyors move from left to right with respect to the views shown in the drawings.

Figure 6:
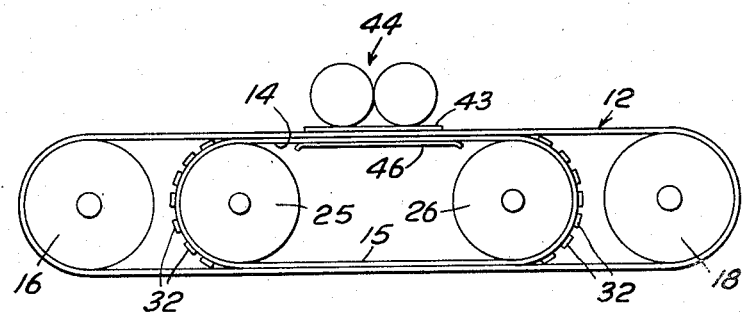
Fig. 6 is a side elevation view of the complete conveyor assembly showing the conveyor moving a ferro-magnetic object such as an automobile license plate past a pair of coating rolls.
Figure 7:
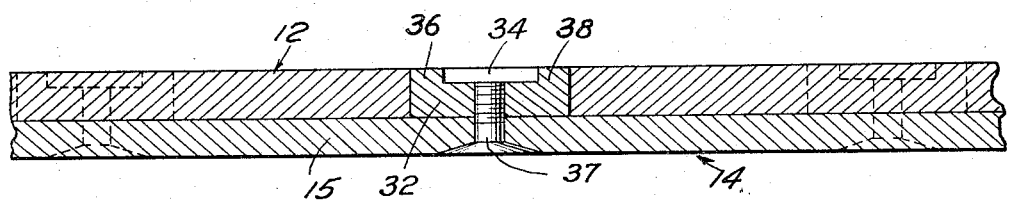
Fig. 7 is a detail view, partially in section, showing the manner in which the magnet elements are attached to the inner or magnet conveyor, and also showing the outer conveyor engaged with the inner conveyor.
Figure 8:
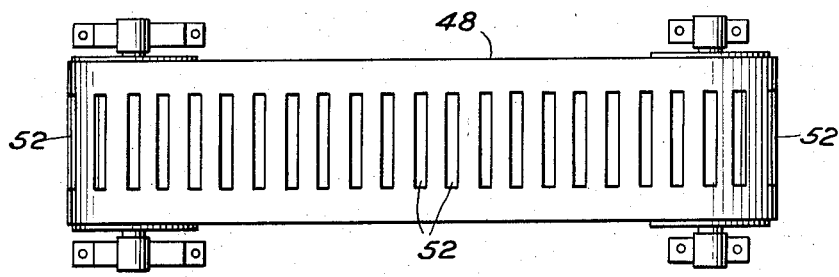
Fig. 8 is a top plan view of an outer conveyor having a modified type of magnet-receiving aperture.
Figure 9:
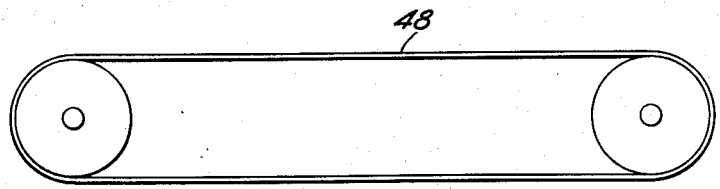
Fig. 9 is a side elevation view of the conveyor of Fig. 8.
Figure 10:
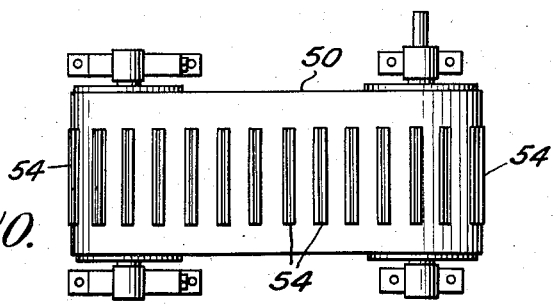
Fig. 10 is a top plan view of an inner magnetic conveyor having rectangular-shaped permanent magnets adapted to engage the apertures of the outer conveyor of Figs. 8 and 9.
Figure 11:
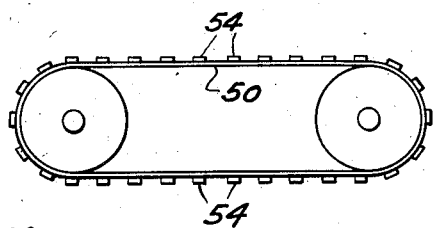
Fig. 11 is a side elevation view of the inner or magnetic conveyor of Fig. 10.

The magnetic conveyor assembly 10 illustrated in Fig. 6 is shown as embodied in a conveying apparatus for moving steel automobile license plates 43 past coating means generally indicated at 44 which apply enamel or the like to the license plates. Backing plate 46 positioned beneath the innermost surface of inner conveyor 14 in the region of coating rolls 14 supports the workpiece while it is being coated. The upper surface of backing plate 46 should be tangent to pulleys 25 and 26. While the license plates are passing adjacent coating rolls 44, it is important that the plates be maintained in a predetermined position on the moving conveyor and be prevented from shifting. In order to accomplish this objective, coating rolls 44 are located intermediate the portion of the conveyor route in which magnets 32 of inner magnetic conveyor 14 engage and pass through apertures 24 of outer conveyor 12.

In order to insure that coating rolls 44 are parallel with respect to backing plate 46, and also to provide a height adjustment between the coating rolls and the backing plate in accordance with variations in the articles as, for example, license plates having different embossing depths, means are provided for leveling and adjusting the height of the coating rolls with respect to the backing plate. To permit this adjustment, coating rolls 44 may be mounted on a housing which is vertically adjustable at four corners by means of four screws or cams similar to the construction described in copending patent application Serial No. 642,967 of Brown et al.

In the operation of the apparatus, it is assumed that the articles being coated such as the automobile license plates, for example, are loaded onto the outer material-carrying conveyor 12 at the left-hand end of the apparatus with respect to the views shown in the drawings, with the conveyors moving from left to right.

As magnets 32 of inner conveyor 14 move in a clockwise circular path about pulley 25, with respect to the view shown in Fig. 6, magnets 32 begin to exert a gradual magnetic attraction toward the license plates 43 supported by outer conveyor 12 in the region immediately preceding the point of tangency of the two conveyors at pulley 25. As soon as the ferromagnetic license plates reach the region where permanent magnets 32 of inner conveyor 14 engage apertures 24 of outer conveyor 12, the plates physically contact the upper surfaces of permanent magnets 32, since magnets 32 are so dimensioned that the pole faces of the magnets lie substantially flush with the outer surface of outer conveyor 12 when the magnets extend through the apertures of the outer conveyor. When magnets 32 actually physically contact the underneath surface of the license plate, the magnetic attraction between the magnet and the license plate greatly increases since the poles of each magnet are directly bridged by the ferromagnetic license plate, with no intervening air gap between the license plate and the magnet. When the license plate contacts the magnets, it is held firmly in position on the conveyor by its magnetic attraction to magnets 32 and does not shift or change its position. The license plate is then carried beneath coating rolls 44 where enamel or the like is transferred from the coating rolls onto the plate. Back-up plate 46 positioned beneath the innermost surface of inner conveyor 14 in the region of coating rolls 44 supports the workpiece while it is being coated.

During the entire period that the upper run of inner conveyor 14 is parallel to the upper run of outer conveyor 12, permanent magnets 32 are in physical contact with the license plate resting on the upper surface of outer conveyor 12. Thus, there is not an air gap or other non-magnetic gap caused by an intervening thickness of the outer conveyor as is true in the case of some prior art magnetic conveyors in which the inner magnetic conveyor is disposed entirely within the outer conveyor and the magnetic field must pass through the intervening space equal to the thickness of the outer conveyor before reaching the ferromagnetic object on the surface of the outer conveyor.

As the license plate or other ferromagnetic object passes over pulley 26 of inner conveyor 14, and magnets 32 begin to move downwardly in a circular path around pulley 26, the magnetic attraction between each magnet and the object is suddenly greatly reduced when the air gap is broken, although the magnet continues to exert some magnetic attraction after it has dropped below the point of tangency of the two conveyors.

Figure 12:
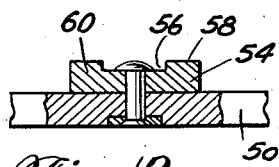
Fig. 12 is a detail view, partially in section, showing the manner in which one of the magnet elements of Fig. 10 may be attached to the magnetic conveyor.

In the embodiment shown in Figs. 8–12, inclusive, there is shown a modified conveyor assembly including an outer material-carrying conveyor 48 and an inner magnet-carrying conveyor 50. Outer conveyor 48 is provided with a plurality of generally rectangular-shaped slots extending transversely of the direction of movement of the conveyor and spaced apart lengthwise of the conveyor. Inner conveyor 50 is provided with a plurality of rectangular-shaped magnets 54 whose size and spacing are such as to cause them to engage the correspondingly shaped apertures 52 of outer conveyor 48. As best seen in Fig. 12, each magnet 54 includes a slot 56 in the upper face, slot 56 extending in a direction lengthwise of the magnet and transverse of the direction of conveyor travel. Two pole faces 58 and 60 lie on either side of slot 56 of each magnet. The structure and operation of the modified magnetic conveyor of Figs. 8–12, inclusive, is otherwise the same as that described in connection with the embodiment of Figs. 1–7 and will not be described again.

It can be seen from the foregoing that there is provided in accordance with this invention a magnetic conveyor which is mechanically and magnetically superior to the magnetic conveying apparatus of the prior art. The engagement of the magnets of one conveyor with the apertures of the other conveyor provides a driving connection between the conveyors so that the power drive source may be applied to only one of the conveyors. Furthermore, the provision of the apertures in the outer conveyor permits the magnets of the inner conveyor to pass into direct physical contact with the ferromagnetic workpiece carried on the surface of the outer conveyor, thereby greatly improving the utilization of the magnetic field of the permanent magnets as compared to magnetic conveyors of the prior art. Furthermore, the shorter length of the inner magnetic conveyor permits the permanent magnets to move into gradual magnetic attraction to the ferromagnetic workpiece until the point of tangency of the inner and outer conveyors is reached, at which point the magnetic attraction of the permanent magnets becomes greatly increased due to the fact that there is no longer an air gap between the magnets and the magnetic workpiece. Similarly, when the magnets pass out of engagement with the workpiece, the magnetic attraction between the magnets and the workpiece suddenly diminishes when the air gap is broken. This is in contrast to magnetic conveyor systems of the prior art in which the magnets are never in physical contact with the workpiece and are always separated by a gap so that the magnetic strength of the magnets of the prior art conveyors is not utilized to its full extent.

It will be obvious to those skilled in the art that various changes may be made without departing from the spirit of the invention and therefore the invention is not limited to what is shown in the drawings or described in the specification, but only as indicated in the appended claims.

What is claimed is:

1. A conveyor assembly comprising a first endless conveyor member, a second endless conveyor member mounted for movement in a path inwardly of and adjacent said first conveyor member, one of said conveyor members having a plurality of apertures therein, and a plurality of magnet members attached to the other of said conveyor members and engageable with said apertures of said one conveyor member.

2. A conveyor assembly as defined in claim 1, in which said magnet members are permanent magnets.

3. A conveyor assembly comprising a first endless conveyor member, a second endless conveyor member mounted for movement in a path inwardly of and adjacent said first conveyor member, said first conveyor member having a plurality of apertures therein, a plurality of magnet members attached to said second conveyor member and engageable with said apertures of said first conveyor member, and drive means for one of said conveyor members.

4. A conveyor assembly comprising a first endless conveyor member, a second endless conveyor member having a shorter path of travel than said first endless conveyor, said second endless conveyor member being mounted for movement in a path inwardly of and adjacent said first conveyor member, said first conveyor member having a plurality of apertures therein, a plurality of magnet members attached to said second conveyor member and engageable with said apertures of said first conveyor member, and drive means for one of said conveyor members.

5. A conveyor assembly comprising a first endless conveyor member, a second endless conveyor member having a run extending substantially parallel to, inwardly of and adjacent a run of said first conveyor member, said first conveyor member having a plurality of apertures therein, a plurality of magnet members attached to said second conveyor member and engageable with said apertures of said first conveyor member, and drive means for one of said conveyor members.

6. A conveyor assembly as defined in claim 5, in which said magnet members of said second conveyor member are arranged in a plurality of rows, each row having a plurality of spaced magnets, and the apertures of said first conveyor member have an arrangement corresponding to that of said magnets.

7. A conveyor assembly as defined in claim 5, in which the magnet members are of substantially cylindrical shape, with their cylindrical axes positioned perpendicularly to the parallel runs of the conveyors, and the apertures are of corresponding shape.

8. A conveyor assembly as defined in claim 5, in which the magnet members are of substantially rectangular shape, with the longitudinal axes of the magnet members being positioned transverse to the direction of conveyor travel.

9. A conveyor assembly comprising a first endless conveyor member, a second endless conveyor member mounted for movement in a path inwardly of and adjacent said first conveyor member whereby the outer surface of said second conveyor member faces the inner surface of said first conveyor member, said first conveyor member having a plurality of apertures therein, said second conveyor member having a plurality of magnet members positioned thereon and engageable with said apertures of said first conveyor member, and drive means for one of said conveyor members.

10. A conveyor assembly comprising a first endless conveyor member, a second endless conveyor member mounted for movement in a path inwardly of and adjacent said first conveyor member whereby the outer surface of said second conveyor member faces the inner surface of said first conveyor member, said first conveyor member having a plurality of apertures therein, said second conveyor member having a plurality of magnet members carried by its outer surface and extending toward the inner surface of said first conveyor member, the magnet members of said second conveyor member being engageable with the apertures of said first conveyor member to establish a driving relation between said first and second conveyor members, and drive means for one of said conveyor members.

11. A conveyor assembly comprising a first endless conveyor member, a second endless conveyor member mounted for movement in a path inwardly of and adjacent said first conveyor member, said first conveyor member having a plurality of apertures therein distributed along the entire length of said first conveyor member in a predetermined spaced relation to each other, said second conveyor member having a plurality of magnet members positioned thereon and distributed along the length of said second conveyor member in the same predetermined spaced relation as the apertures of said first conveyor, the magnet members of said second conveyor member being engageable with the apertures of said first conveyor member to establish a driving relation between said first and second conveyor members, and drive means for one of said conveyor members.

12. A conveyor assembly comprising a first endless conveyor member, a second endless conveyor member having a run extending substantially parallel to, inwardly of and adjacent a run of said first conveyor member, said second conveyor member moving away from said run of said first conveyor member in arcuate paths at opposite ends of said run of said second conveyor member, said first conveyor member having a plurality of apertures therein, said second conveyor member having a plurality of magnet members positioned thereon and engageable with said apertures of said first conveyor member, and drive means for one of said conveyor members.

13. A conveyor assembly comprising a first endless conveyor member, a second endless conveyor member having a run extending substantially parallel to, inwardly of and adjacent a run of said first conveyor member, said first conveyor member having a plurality of apertures therein, a plurality of magnet members attached to said second conveyor member and engageable with said apertures of said first conveyor member, each of said magnets including a pair of poles directed toward said run of said first conveyor member, and drive means for one of said conveyor members.

14. A conveyor assembly comprising a first pair of spaced pulley members, a first endless conveyor movable about said first pair of pulley members, a second pair of spaced pulley members located intermediate said first pair of pulley members, a second endless conveyor of shorter length than said first conveyor movable about said second pair of pulley members, said second conveyor moving along a path lying within and adjacent the path of said first conveyor, said first conveyor having a plurality of apertures therein, said second conveyor having a plurality of magnet members positioned thereon and engageable with said apertures of said first conveyor, and drive means for one of said conveyors.

References Cited in the file of this patent

UNITED STATES PATENTS 2,708,022    Pettigrew    May 10, 1955